Dec. 24, 1935.    E. J. LEES    2,025,688
FINISHING TOOL
Original Filed Dec. 8, 1930    2 Sheets-Sheet 1

Ernest J. Lees  INVENTOR.
BY
Harvey R. Hawgood
ATTORNEY.

Dec. 24, 1935.  E. J. LEES  2,025,688
FINISHING TOOL
Original Filed Dec. 8, 1930  2 Sheets-Sheet 2
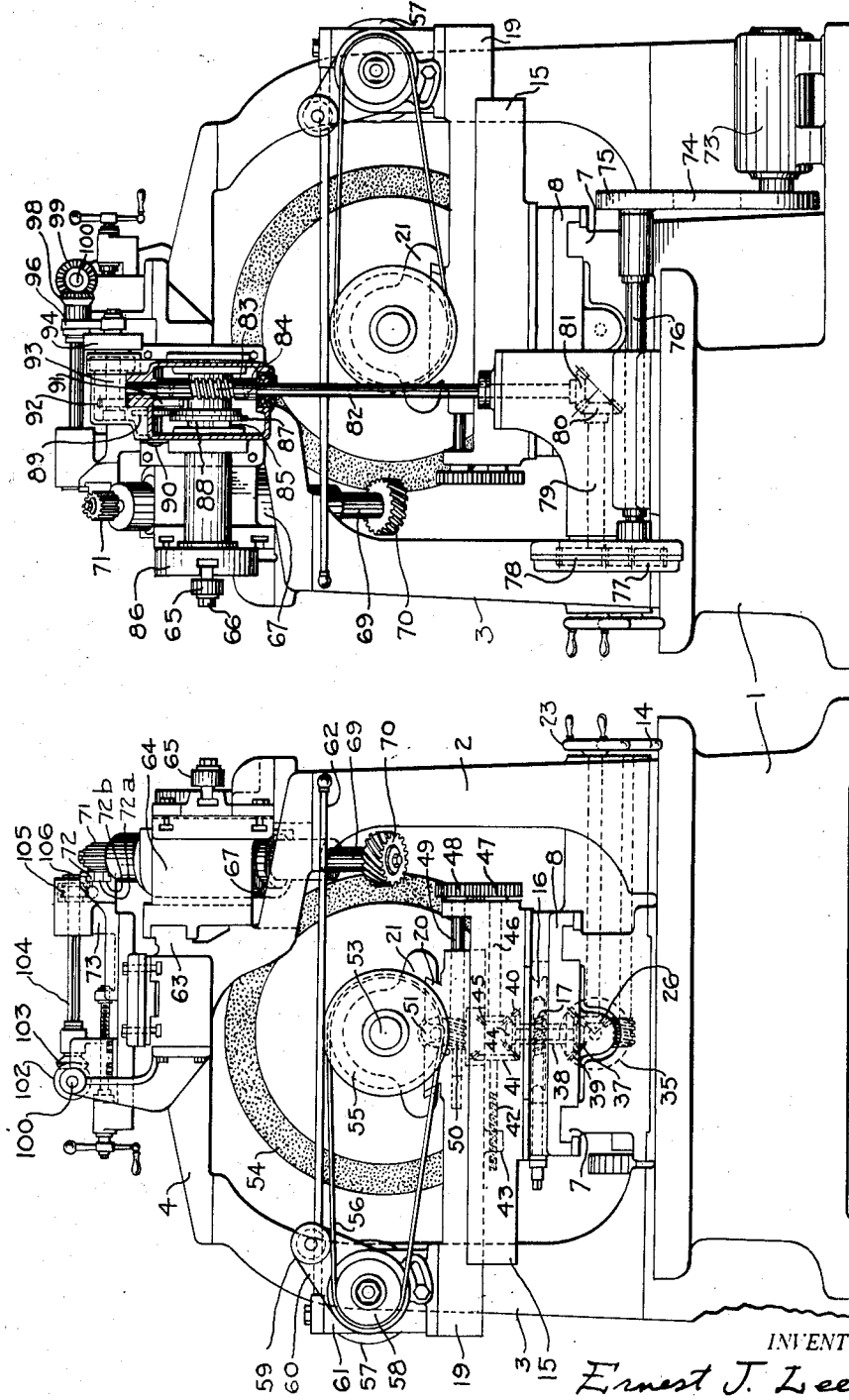
INVENTOR.
Ernest J. Lees
BY
Harvey R. Hawgood
ATTORNEY.

Patented Dec. 24, 1935

2,025,688

UNITED STATES PATENT OFFICE 2,025,688

FINISHING TOOL

Ernest J. Lees, Cleveland, Ohio, assignor to The Lees-Bradner Company, Cleveland, Ohio, a corporation of Ohio Application December 8, 1930, Serial No. 500,692
Renewed June 13, 1935

19 Claims. (Cl. 51—123)

This invention relates to methods and machines for cutting surfaces of gear teeth and the like, and is particularly applicable to the cutting of inclined teeth such as those of helical gears.

An object of the invention is to provide an improved machine by which helical gear teeth and the like may be cut by generating a desired tooth surface.

Another object of the invention is to provide an improved method by which the teeth of a helical gear may be so moved relative a cutting device that the true curve desired will be generated upon each tooth.

Another object is to provide an improved mechanism by which two surfaces can be simultaneously generated with extreme accuracy.

Another object is to provide a mechanism which will be simple in construction and operation.

Another object is to provide an improved mechanism in which comparatively few parts must be formed with extreme accuracy.

Other objects will hereinafter appear.

The invention will be better understood from the description of one practical embodiment thereof illustrated in the accompanying drawings, in which:

Figure 2 is an end elevation of the machine of Figure 1 taken from the left of this figure; and Figure 3 is a similar elevation taken from the right of Figure 1.

Figure 1:
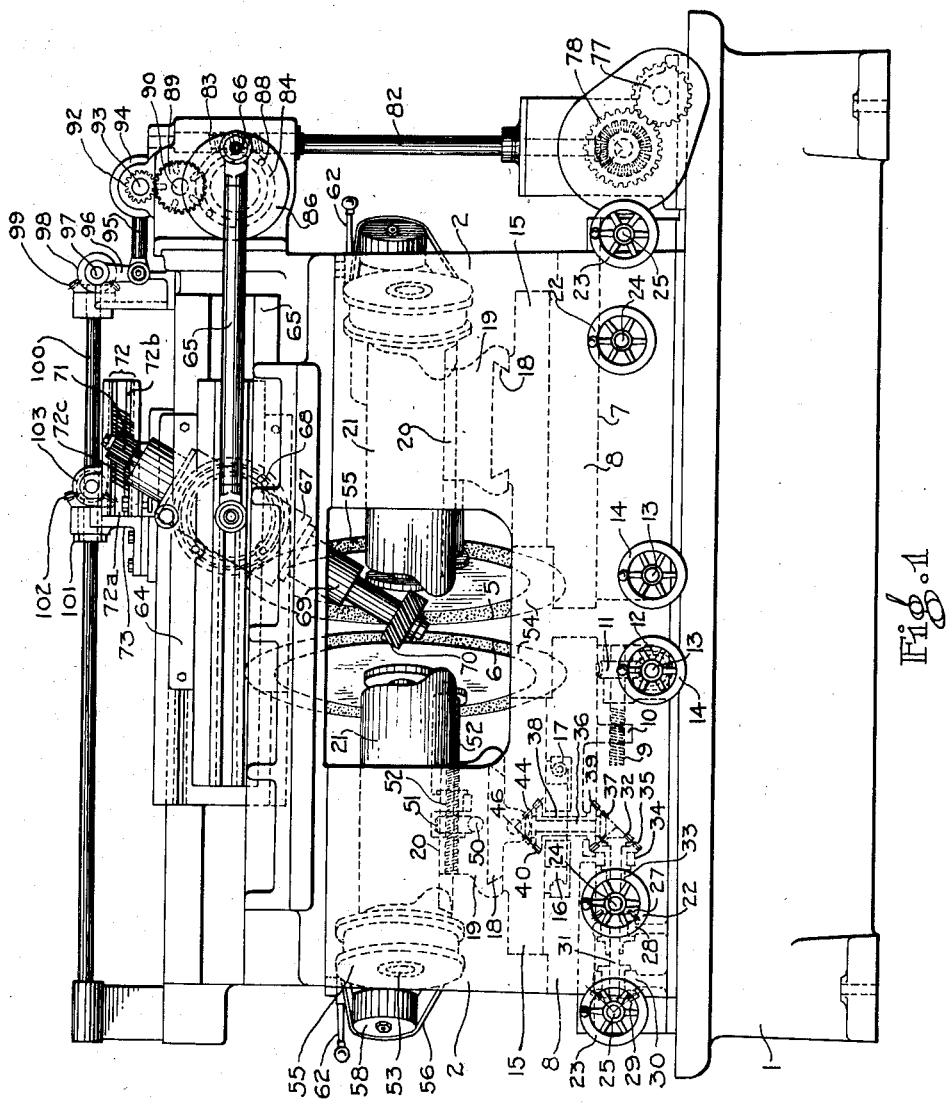
Figure 1 is a front elevation of the machine embodying the invention.

The machine comprises a bed or base 1 upon which the cutting mechanism, illustrated as a pair of grinding wheels, and the work supporting mechanism are carried. Upwardly extending supports 2 and 3 are rigidly attached to the bed and carry a horizontal or top supporting member 4 on which the work holding apparatus is positioned.

The vertical and horizontal supports 2, 3 and 4 enclose a central space within which the cutting members, illustrated as a pair of grinding wheels 5 and 6, are positioned. Horizontal ways 7 are formed on the upper surface of the bed within the central open space, these ways extending longitudinally along said space, and upon these are mounted two tables or carriages 8 which may be adjusted along said ways by screws 9 threaded through depending bosses 10 on the carriages, each screw being provided with a worm wheel 11 with which meshes a worm 12 mounted on a horizontal shaft 13 and provided at its outer end with a handwheel 14.

Pivoted upon each table 8 to be adjustable about a vertical axis is a circular support 15. Formed integrally with the support is a depending flange 16 provided on its outer periphery with worm wheel teeth which mesh with a worm formed on a shaft 17 having a squared end to receive a wrench, crank or handle by which the angular position of the support may be adjusted.

Guides or ways 18 are formed upon the upper surface of the circular support and a slide 19 adjustably carried thereby. The slide 19 is provided on its upper surface with guides or ways 20 extending in a direction perpendicular to the guides 18 and mounted on the last mentioned ways in a tool spindle supporting member 21.

Means for operating the tool spindle support consist of two handwheels 22 and 23 mounted on horizontal shafts 24 and 25 respectively. The inner ends of these shafts are provided with bevelled pinions 26, that on shaft 24 meshing with a bevelled pinion 27 supported in a bearing 28 carried by the base, and that on shaft 25 meshing with the bevelled pinion 29 similarly supported in bearing 30. The pinion 29 is splined to a horizontal shaft 31 which carries on its inner end a bevelled pinion 32. A sleeve 33 surrounds shaft 31 and to the sleeve is splined pinion 27, the sleeve being supported in bearing 34, and assisting in supporting the shaft 31, the sleeve terminating in a bevelled pinion 35.

A central vertical shaft 36 terminates in a bevelled pinion 37 meshing with pinion 32 and is surrounded with a sleeve 38 having at its lower end a bevelled pinion 39 meshing with pinion 35, the shaft being journalled in the sleeve and the sleeve, in turn, being journalled in the carriage 8. The upper end of sleeve 38 is provided with a bevelled pinion 40 which meshes with the gear 41 fixed to a screw 42, the screw being threaded through a depending boss 43 on the slide 19, so that, irrespective of the position of the table, rotation of handwheel 22 will cause the slide to be translated along ways 18.

A bevelled pinion 44 is secured to the upper end of shaft 36 and meshes with a bevelled pinion 45 on a horizontal shaft 46 journalled in the circular table 15. The end of this shaft is provided with a gear 47 meshing with a gear 48 secured to a shaft 49 to which is splined a worm 50 driving a worm wheel 51 having a thread on its interior, by which it may be caused to traverse a screw 52 secured to the spindle support 21, and so traverse this support along guides 20.

A spindle 53 is journalled in the support 21 and is provided on its inner end with a grinding wheel having a flat outwardly directed grinding face 54, with which the cutting of the gear teeth is effected. The opposite end of the spindle is provided with a pulley 55 driven by a belt 56 by power from a motor 57, the motor driving a pulley 58 carried by slide 19. Adjustment of the belt is provided by idler on 59 on an arm 60 pivoted on the axis of the motor shaft. A clutch 61 having an operating handle 62 releases the pulley 58 from the motor, or engages it with the power shaft, as may be required in the operation of the machine.

The work carrying portion of the mechanism comprises guides 63 formed in the support 4 on which is mounted a slide 64 which may be reciprocated by means of a connecting rod 65 operated by a crank 66 driven by mechanism to be hereinafter described.

Trunnioned on the slide is a work spindle support 67 which is clamped into position as by bolts 68 and in which is journalled a work spindle 69 to the lower end of which a work gear 70 may be secured.

The upper end of the work spindle has connected to it a spur pinion 71, which meshes with the oblique teeth of a rack 72 adjustably carried in a holder 73 which may be adjustably secured upon the upper surface of support 4.

This rack is formed of three parts, the central one of which, 72a, is rigidly connected to the carrier, while the lower one of which, 72b, is slidable and urged slightly out of alinement with the stationary portion by a spring for the purpose of preventing any looseness or backlash between the pinion 71 and the teeth of the stationary portion. The upper portion, 72c, of the rack extends beyond the stationary and lower portions, and may be moved a distance equal to that between adjacent teeth for indexing the work spindle. The means for operating this indexing portion of the rack will be later described.

The means for operating the work carrying mechanism consists of a motor 73 mounted on the base 1 and driving, through a belt 74, a pulley 75 and the end of a transverse shaft 76 journalled on the base, the opposite end of which shaft is provided with a gear 77 driving a gear 78 secured to another transverse horizontal shaft 79. The gears 77 and 78 may be changed to vary the speeds at which the parts are driven.

The shaft 79 is provided at its inner end with a bevelled pinion 80 meshing with a bevelled pinion 81 on a vertical shaft 82 which, adjacent its upper end, is provided with a worm 83 driving a worm wheel 84 attached to a horizontal shaft 85 having at its outer end a slotted crank disc 86 in the slot of which the crank 66 is adjustably mounted.

The shaft 85 is also provided with a disc 87 having a pin 88 constituting one element of a Geneva movement, the other element of which is a notched disc 89 mounted on a shaft 90 provided with a gear 91 driving a gear 92 upon a shaft 93 with an intermittent motion.

The shaft 93 carres a crank disc 94 operating a connecting rod 95 which oscillates an arm 96 attached to shaft 97 provided at one end with a bevelled pinion 98. This pinion drives a bevelled pinion 99 attached to a shaft 100. Splined upon shaft 100 is a sleeve 101 journalled in the rack carrier 73 so that it may be oscillated at any position by the drive above described. This sleeve is provided on one end with a bevelled pinion 102 meshing with a bevelled pinion 103 fixed to a transverse shaft 104 also journalled cn carrier 73. Splined upon shaft 104 is a pinion 105 which meshes with a rack 106 cut in the upper edge of part 72c, (the indexing rack) so that the indexing rack is reciprocated back and forth by the action of the Geneva movement. This reciprocation, of course, takes place when the work gear has rolled beyond the grinding wheels and turns the same one or more teeth, allowing the master gear to roll back onto the fixed portion 72a of the rack before the teeth contact the grinding wheels.

By using a rack having inclined teeth parallel to the axis of the work spindle, it is possible to use a spur pinion at 71. While it would be possible to use a pinion with helical teeth and a rack with vertical teeth, this cannot be done until the machine has been used to generate the required master gear, as no prior type of machine is capable of accurately generating tooth surfaces of helical gear. However, the spur gear above described may be accurately made upon types of machines already known, and with a rack having inclined teeth, it is possible to obtain an accurate rolling motion of the work spindle, and so hereafter will be possible to produce accurate helical master gears.

While I have described the illustrated embodiment of my invention in some particularity, obviously many others will readily occur to those skilled in this art, and I, therefore, do not limit myself to the precise details shown and described herein, but claim as my invention all embodiments, variations and modifications coming within the scope of the appended clams.

I claim:

1. A machine comprising two rotating cutters having flat cutting surfaces lying in planes forming a dihedral angle, a work supporting spindle translatable in a direction normal to the apex of said dihedral angle, and rotatable about its axis, its axis being oblique to the apex of said dihedral angle.

2. A machine comprising two rotating cutters having plane cutting surfaces, the planes of the surfaces forming a dihedral angle, a work supporting slide moving in a direction normal to the plane bisecting said dihedral angle, a rotatable spindle carried thereby having its axis disposed obliquely to the plane bisecting said dihedral angle, and means for translating said slide and simultaneously rotating said spindle.

3. A machine comprising a base, two obliquely disposed horizontal tool spindles supported thereby, means for rotating said spindles, a horizontally movable slide, a work spindle trunnioned on said slide and adjustably secured thereto at any desired angular position, and means for reciprocating said slide and simultaneously rotating said work spindle.

4. A machine of the character described comprising two tools having flat working surfaces lying in planes forming a dihedral angle, a work spindle translatable in a direction normal to the apex of said dihedral angle and rotatable upon its axis, its axis being oblique to the apex of said work dihedral angle.

5. A machine of the character described comprising a base, a slide reciprocably supported thereby, a work supporting spindle journalled in the slide and disposed at an oblique angle to the direction of the motion of the slide, a gear having teeth parallel its axis fixed to one end of the spindle, and a rack having oblique teeth parallel to the axis of the spindle carried by the base meshing with said gear.

6. A machine of the character described, comprising a base, a slide reciprocably supported thereby, a work supporting spindle journalled in the slide and disposed at an oblique angle to the direction of the motion of the slide, a gear having teeth parallel its axis fixed to one end of the spindle, a rack having oblique teeth parallel to the axis of the spindle carried by the base meshing with said gear, the rack consisting of a stationary part upon which the gear may roll during the working portion of the reciprocation of the slide, an indexing portion movable relative the fixed portion, and means for moving said movable portion when the gear has rolled beyond said fixed portion.

7. A machine of the character described comprising a frame, a slide reciprocable thereon, a spindle journalled in the slide, a flat-faced tool carried by the frame and having a flat working face, the spindle being oblique to said working face and to the direction of motion of the slide, and means causing the spindle to rotate as the slide is reciprocated with a rolling action relative the frame whereby a work piece supported by the spindle has an involute-generating action in passing the flat face of the tool.

8. A machine of the character described comprising a frame, a slide reciprocable thereon, a spindle journalled in the slide, two flat-faced tools carried by the frame and having flat working faces, the spindle being oblique to said working faces and to the direction of motion of the slide, and means causing the spindle to rotate upon the reciprocation of the slide with a rolling action relative the frame whereby a work piece supported by the spindle has an involute-generating action in passing the flat faces of the tools in either direction.

9. A machine of the character described comprising a frame, stationary journals therein, two tool spindles carried by said journals and disposed with their axes in oblique relation, flat-faced tools on said spindles, a slide carried by the frame, a work spindle journalled in said slide and having its axis oblique to the direction of the motion thereof, a master gear carried by the work spindle, a master rack fixed to the frame and meshing with said master gear whereby as the slide is reciprocated a work gear carried by the work spindle is caused to roll with a generating action relative the planes of both said tools.

10. A machine of the character described comprising a frame, stationary journals therein, two tool spindles carried by said journals and disposed with their axes in oblique relation, flat-faced tools on said spindles, a slide carried by the frame and reciprocable in a plane parallel to that defined by the axes of the tool spindles, a work spindle journalled in said slide and having its axis oblique to the direction of the motion thereof, a master gear carried by the work spindle, a master rack fixed to the frame and meshing with said master gear whereby as the slide is reciprocated a work gear carried by the work spindle is caused to roll with a generating action relative the planes of both said tools.

11. The method of finishing gear teeth which comprises supporting a work gear with its axis oblique to the flat surface of a cutting tool, translating the gear relative the tool in a direction oblique to its axis and to the flat surface of the tool, and simultaneously rotating the gear to cause a tooth to roll across the flat surface of the tool.

12. The method of finishing helical gear teeth which comprises rolling a work gear blank across a flat-faced cutting tool, the direction of the translatory component of the motion of the work gear being oblique to its axis.

13. The method of finishing helical gear teeth which comprises rolling a work gear across the flat surfaces of two cutting tools, these surfaces lying in intersecting planes, the translatory component of the rolling motion of the work gear being in a direction oblique to the axis of the work gear and in a plane normal to the intersection of said first mentioned planes.

14. A helical gear producing machine of the character described comprising a frame, a work spindle slidably and rotatably mounted thereon, the direction of the sliding motion being oblique to the axis of the spindle, means for sliding the spindle, inter-engaging means carried by the spindle and frame whereby the means carried by the spindle is caused to roll upon that carried by the frame when the spindle is moved, and cutting means carried by the frame having cutting surfaces defining the sides of a dihedral angle, the apex of the dihedral angle and axis of the work spindle being noncoplanar.

15. The method of finishing helical gear teeth which comprises providing cutting means having cutting edges operating in two sides of a dihedral angle, supporting a work gear with its axis in a plane parallel to the apex of said dihedral angle and oblique to the trace of said apex in said plane, translating the gear relative the cutting means while maintaining its axis in said plane, and simultaneously rotating the gear to cause its teeth to roll across the dihedral angle.

16. A helical gear producing machine of the character described comprising a base, cutting means carried thereby having cutting surfaces operating in the sides of a dihedral angle, a work spindle slidably and rotatably carried by the base and slidable in a plane parallel to the apex of said dihedral angle, the axis of said spindle being oblique to the trace of the apex of the dihedral angle upon said plane and positive rotating means associated with said spindle causing it to rotate as it is reciprocated.

17. A helical gear producing machine of the character described comprising a base, cutting means carried thereby having cutting surfaces operating in the sides of a dihedral angle, a work spindle slidably and rotatably carried by the base and slidable in a plane parallel to the apex of said dihedral angle, and perpendicular to a plane bisecting said dihedral angle, the axis of said spindle being oblique to the trace of the apex of the dihedral angle upon said plane, and positive rotating means associated with said spindle causing it to rotate as it is reciprocated.

18. A helical gear producing machine of the character described comprising a base, cutting means carried thereby having cutting surfaces operating in the sides of a dihedral angle, a work spindle slidably and rotatably carried by the base and slidable in a plane parallel to the apex of said dihedral angle, the axis of said spindle being oblique to the trace of the apex of the dihedral angle upon said plane, a master rack carried by the base, a master gear conjugate thereto fixed to the spindle, and indexing means engageable with the master gear and operative during that part of the cycle when work is not being cut.

19. A helical gear producing machine of the character described comprising a base, cutting means carried thereby having two cutting surfaces which operate in the sides of a dihedral angle, a work spindle carried by the base and reciprocable in a plane parallel to the apex of said dihedral angle, the axis of the spindle being noncoplanar with said apex of the dihedral angle, and means positively rotating the spindle as it is reciprocated.

ERNEST J. LEES.

CERTIFICATE OF CORRECTION.

Patent No. 2,025,688.  December 24, 1935.

ERNEST J. LEES.

It is hereby certified that error appears in the printed specification of the above numbered patent requiring correction as follows: Page 2, first column, line 55, for "carres" read carries; and second column, line 57, claim 4, strike out the word "work"; and that the said Letters Patent should be read with these corrections therein that the same may conform to the record of the case in the Patent Office.

Signed and sealed this 17th day of March, A. D. 1936.

Leslie Frazer (Seal)  Acting Commissioner of Patents.